United States Patent [19]
Takahashi

[11] Patent Number: 5,909,639
[45] Date of Patent: Jun. 1, 1999

[54] RADIO SELECTIVE CALLING RECEIVER

[75] Inventor: Satoshi Takahashi, Shizuoka, Japan

[73] Assignee: NEC Corporation, Toyko, Japan

[21] Appl. No.: 08/869,974

[22] Filed: Jun. 5, 1997

[30] Foreign Application Priority Data

Jun. 25, 1996 [JP] Japan .................................. 8-164132

[51] Int. Cl.$^6$ .................................................. H04Q 7/20
[52] U.S. Cl. ........................ 455/31.1; 455/307; 455/310
[58] Field of Search ............................. 455/31.1–31.3, 455/38.3, 266, 296, 303, 306–307, 280, 286, 293, 566, 310; 340/825.44, 311.1

[56] References Cited

U.S. PATENT DOCUMENTS

| | | | |
|---|---|---|---|
| 5,577,270 | 11/1996 | Sakai ..................................... | 455/180.1 |
| 5,613,218 | 3/1997 | Li et al. ................................ | 455/296 X |
| 5,758,296 | 5/1998 | Nakamura ............................ | 455/307 X |
| 5,842,116 | 11/1998 | Nishida et al. ....................... | 455/296 |

FOREIGN PATENT DOCUMENTS 3-162136  7/1991  Japan .

*Primary Examiner*—Dwayne D. Bost
*Assistant Examiner*—William G. Trost
*Attorney, Agent, or Firm*—Whitham, Curtis & Whitham

[57] ABSTRACT

A conductive frame for supporting a display section is higher in cost than a resin frame, and causes electric contact with other parts and a deterioration in sensitivity due to noise radiations to the antenna. When a radio selective calling receiver is in a normal standby state, since a display driving section (50) is in an inoperative state, a display detecting section (60) detects the non-execution of a display operation and sends a non-display operation signal to an intermediate-frequency section (20). In the intermediate-frequency section (20), a switch section (22) selects a filter (23) in accordance with this non-display operation signal and connects it between a radio section (10) and a demodulating section (21). When the user performs an operation of displaying time display information, calendar display information, or stereotyped expression display information on a display section (40) ion this normal standby state, the display driving section (50) is set in an operative state. The display detecting section (60) detects the execution of a display operation, and sends a display operation signal to the intermediate-frequency section (20). In the intermediate-frequency section (20), the switch section (22) selects a filter (24) in accordance with this operation signal and connects it between the radio section (10) and the demodulating section (21).

4 Claims, 3 Drawing Sheets

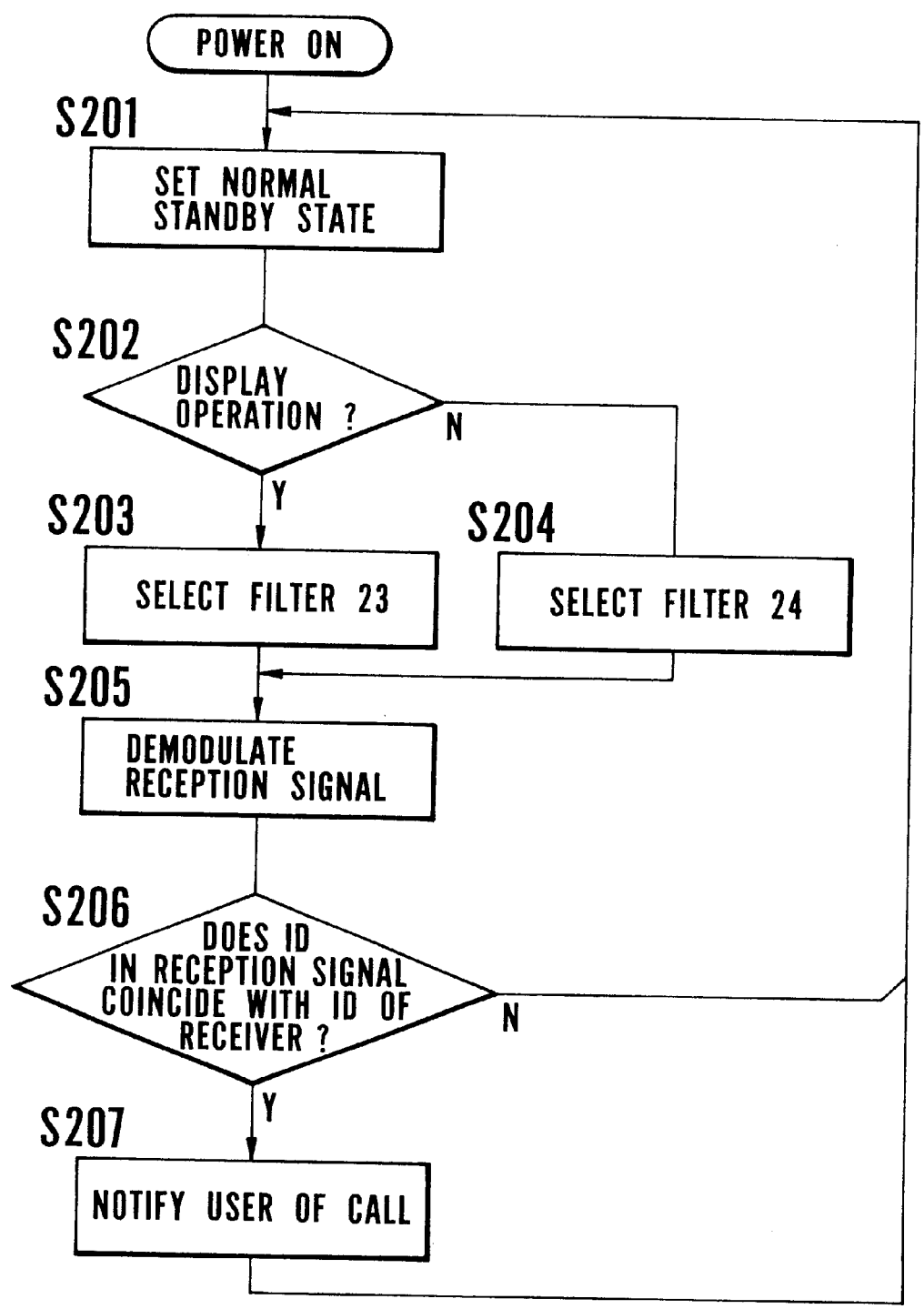

RADIO SELECTIVE CALLING RECEIVER

BACKGROUND OF THE INVENTION

1. Field of the Invention

The present invention relates to a radio selective calling receiver and, more particularly, to a radio selective calling receiver which can eliminate display noise during a display operation.

2. Description of the Prior Art

A radio selective calling receiver is generally called through the use of a call number assigned thereto. General radio selective calling receivers are designed to display information such as a message on the display section. For example, some receivers are designed to always display the time, and others are designed to reduce the current consumption by keeping the display power supply off normally.

Recently, there have been increasing number of radio selective calling receivers which have been equipped with a variety of functions which can be set by the switching operation performed by users, e.g., the memo function, the telephone directory function, and the function of exchanging stereotyped expressions created by the users, instead of just being used for calling operations by the users. Under the circumstances, a relatively large number of radio selective calling receivers are designed to perform various display operations.

The display means of many such receivers display information on liquid crystal displays (LCDs). Such a display means boosts a voltage in an LCD driving section, and displays information on the LCD at the boosted voltage. When the voltage is boosted, noise tends to occur. The radiation of this LCD driving noise may adversely affect the radio section.

For this reason, LCD driving noise may noise cause a deterioration in the sensitivity of many radio selective calling receivers. Some radio selective calling receivers are therefore provided with measures to reduce the noise.

For example, the radio selective calling receiver disclosed in Japanese Unexamined Patent Publication No. 3-162136 is provided with the following measure to reduce such noise at the display section. The frame that supports the display section is made of a conductive member and directly connected to the ground line (the ground of the substrate) of the receiver. With this structure, the impedance of the ground line of the receiver is decreased to improve the shielding effect.

According to this conventional radio selective calling receiver, since the frame that supports the display section is made of a conductive member, the cost is high as compared with a case in which the frame is made of a resin material. In addition, the frame may cause electric contact with other parts, and a deterioration in sensitivity and the like occur because of the influences of noise radiations to the antenna.

SUMMARY OF THE INVENTION

It is an object of the present invention to provide a radio selective calling receiver which can suppress a deterioration in the sensitivity of the radio section without causing electric contact with other parts and any deterioration in sensitivity due to the influences of noise radiations to the antenna.

According to the present invention, there is provided a radio selective calling receiver for displaying information indicating the reception of a call upon reception of a radio signal including an identification number assigned to the receiver, comprising an intermediate-frequency section having a first filter used in a normal standby state and a second filter used in a display operation, display detecting means for detecting the execution/non-execution of the display operation, and filter switching means for switching from the first filter to the second filter when the display detecting means detects the execution of the display operation.

The radio selective calling receiver is characterized by further comprising display means for displaying information indicating the reception of a call upon reception of a radio signal including the identification number assigned to the receiver, and display control means for inhibiting display of information including time information and a message on the display means in the normal standby state and allowing to display the information including the time information and the message on the display means when a user operates a switch.

The radio selective calling receiver is characterized in that the first and second filters of the intermediate-frequency section have different characteristics, the first filter being a filter in which a constant is set to remove baud rate frequency noise including intermediate-frequency noise, and the second filter being a filter in which a constant is set to remove, in addition to the baud rate frequency noise, noise caused when a liquid crystal display of the display means is driven.

The radio selective calling receiver is characterized in that the display means comprises at least one of a light-emitting diode, a vibrator, and a speaker in addition to the liquid crystal display.

BRIEF DESCRIPTION OF THE DRAWINGS

FIG. 2 is a flow chart for explaining the operation of the embodiment;

DETAILED DESCRIPTION OF THE PREFERRED EMBODIMENT

The present invention will now be described with reference to the accompanying drawings.

Figure 1:
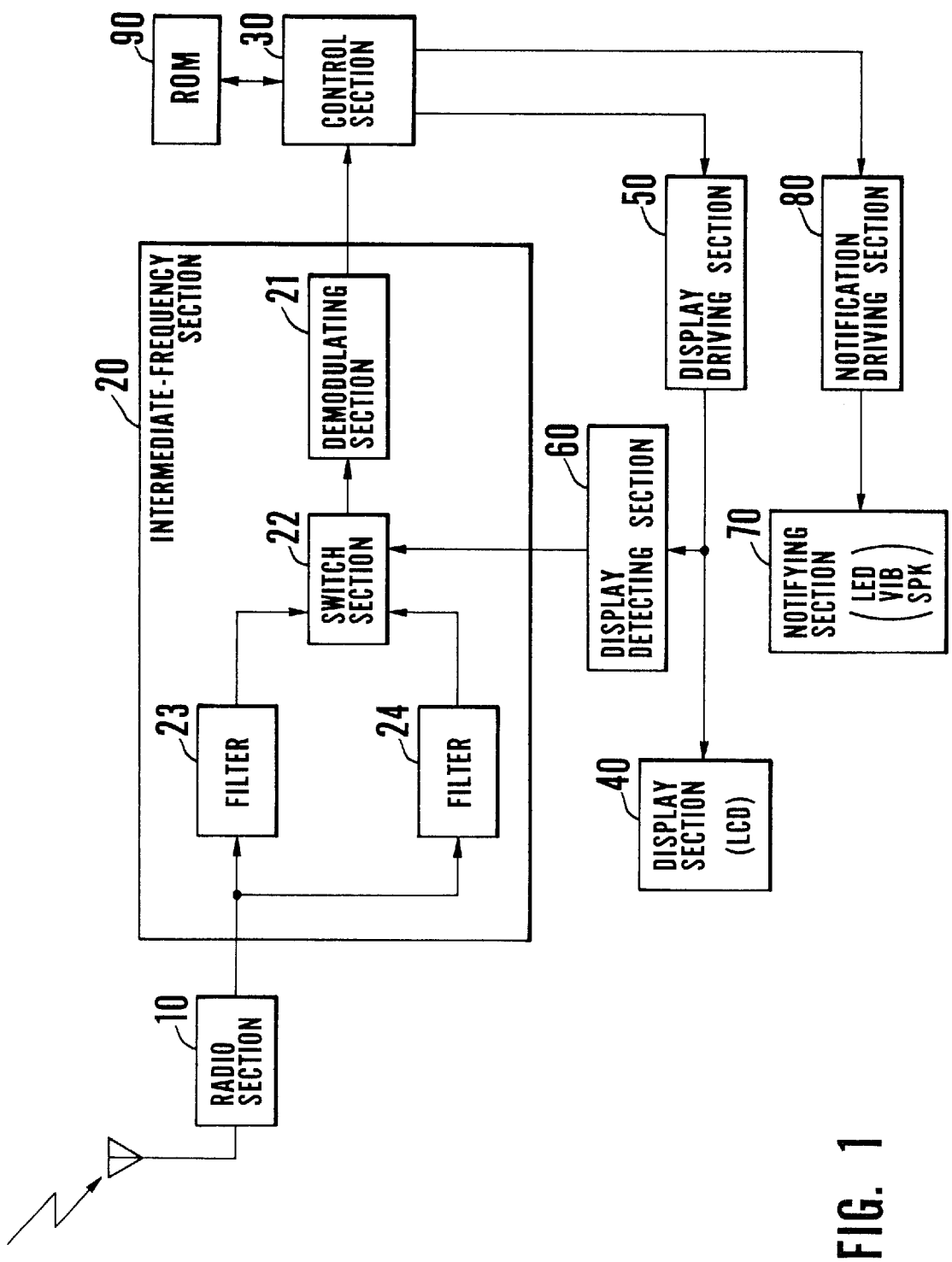
FIG. 1 is a block diagram showing a radio selective calling receiver according to an embodiment of the present invention.
Figure 3A:
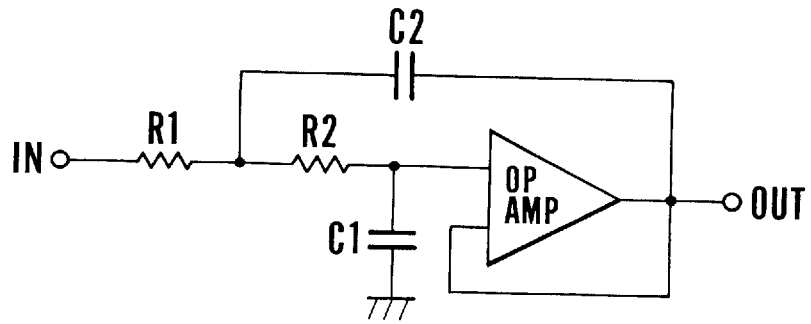
FIG. 3A is a circuit diagram showing a first filter used for the radio selective calling receiver in FIG. 1.
Figure 3B:
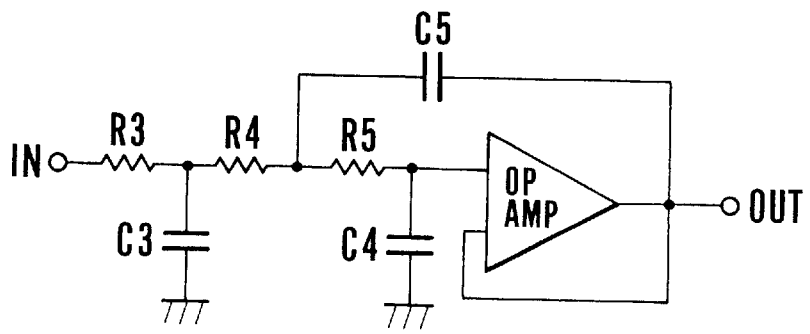
FIG. 3B is a circuit diagram showing a second filter used in the receiver.
Figure 4:
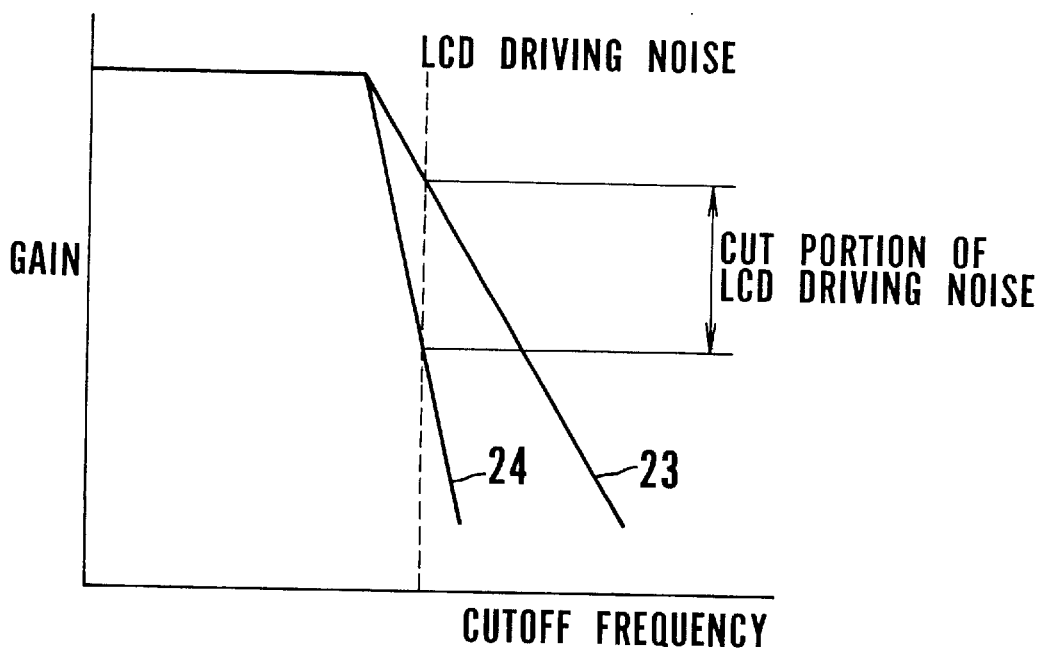
FIG. 4 is a graph showing the characteristics of the first and second filters in FIGS. 3A and 3B.

FIG. 1 is a block diagram showing a radio selective calling receiver according to an embodiment of the present invention. FIG. 2 is a flow chart for explaining the operation of this embodiment. FIGS. 3A and 3B are circuit diagrams showing first and second filters in FIG. 1. FIG. 4 is a graph showing the characteristics of the filters in FIGS. 3A and 3B.

Referring to FIG. 1, the radio selective calling receiver according to the embodiment of the present invention includes a radio section 10 for receiving a transmission signal from a base station (not shown), an intermediate-frequency section 20 for demodulating and converting a signal from the radio section 10 into a digital signal, a control section 30 for controlling a display means in accordance with the reception signal demodulated by the intermediate-frequency section 20, a display section 40 for displaying information such as call information or a message, a display driving section 50 for driving the LCD of the display section 40, a display detecting section 60 for informing the intermediate-frequency section 20 of the execution of a display operation upon detection of an LCD driving voltage from the display driving section 50, a notifying section 70 having a notifying means, e.g., a light-emitting diode (LED), a vibrator (VIB), or a speaker (SPK), which is used to notify the user of a call, a notification driving section 80 for driving the notifying means of the notifying section 70, and a ROM 90 in which the identification number assigned to the radio selective calling receiver is stored in advance.

The intermediate-frequency section 20 includes a demodulating section 21 for demodulating and converting a signal from the radio section 10 into a digital signal, two filters 23 and 24 for removing intermediate-frequency noise and also removing LCD driving noise caused when the display section 40 is driven, and a switch section 22 for switching the filters 23 and 24 in accordance with the notification of the execution/non-execution of a display operation from the display detecting section 60. Note that the intermediate-frequency section 20 is generally constituted by an integrated circuit.

The operation of this embodiment will be described next with reference to FIGS. 2, 3A, 3B, and 4.

When the radio selective calling receiver is in a normal standby state (step S201), since the control section 30 displays no information on the display section 40, the display driving section 50 is an inoperative state.

The display detecting section 60 therefore detects the non-execution of a display operation (YES in step S202), and sends a non-display operation signal to the intermediate-frequency section 20. In the intermediate-frequency section 20, the switch section 22 selects the filter 23 in accordance with this non-display operation signal (step S203), and connects it between the radio section 10 and the demodulating section 21.

When the user performs an operation of displaying information such as time display, calendar display, or stereotyped expression display information on the display section 40 in this normal standby state, the display driving section 50 is set in an operative state. The display detecting section 60 then detects the execution of a display operation (NO in step S202), and sends a display operation signal to the intermediate-frequency section 20. In the intermediate-frequency section 20, the switch section 22 selects the filter 24 in accordance with this display operation signal (step S204), and connects it between the radio section 10 and the demodulating section 21.

After the processing in steps S203 and S204, the demodulating section 21 demodulates and converts the signal input through the switch section 22 into a digital signal (step S205), and sends the digital signal to the control section 30. The control section 30 compares the identification number extracted from this received digital signal with the identification number assigned to the receiver itself and read out from the ROM 90. If the two identification numbers coincide with each other (YES in step S206), the control section 30 controls the notification driving section 80 to notify the user that the radio selective calling receiver is called (step S207).

If NO in step S206, i.e., the identification numbers do not coincide with each other, since the radio selective calling receiver is not called, the receiver returns to the normal standby state (step S201).

After the notification in step S207, the flow returns to step S201 to set the normal standby state.

As shown in FIG. 3A, the filter 23 is constituted by resistors R1 and R2, capacitors C1 and C2, and an operational amplifier OPAMP. As shown in FIG. 3B, the filter 24 is constituted by resistors R3, R4, and R5, capacitors C3, C4, and C5, and an operational amplifier OPAMP. The filters have different filter characteristics based on the differences between the resistances, the capacitances, and the circuit configurations.

In this embodiment, the filter 23 is selected when no display operation is to be performed. In this period, since no LCD driving noise is caused by the LCD of the display section 40, the constant for the filter 23 is set such that the filter has the characteristics of cutting components having frequencies equal to or higher than the baud rate frequency/2 (e.g., 600 Hz when the baud rate is 1,200 bps) including intermediate-frequency noise.

When a display operation is to be performed, the filter 24 is selected. During this period, since LCD driving noise is generated, the constant for the filter 24 is set such that the filter has the characteristics of cutting LCD driving noise as well as baud rate frequency noise including intermediate-frequency noise.

FIG. 4 shows that the filter 24 cuts LCD driving noise as well as the noise frequency components cut by the filter 23.

As described above, according to this embodiment, the filter 23 or 24, which is selected in accordance with the execution/non-execution of a display operation, removes noise from a signal received by the radio section 10, and the resultant signal is converted into a digital signal by the demodulating section 21 in the intermediate-frequency section 20.

The demodulated reception signal is sent to the control section 30. The control section 30 collates the identification number in the reception signal with the identification number assigned to the radio selective calling receiver and read out from the ROM 90. If the two identification numbers coincide with each other, the control section 30 sends driving control signals to the display driving section 50 and the notification driving section 80. With this operation, the display section 40 displays a message or the like, and the notifying section 70 generates a notification output to notify the user of the call.

As has been described above, according to the present invention, the radio selective calling receiver for display information indicating the reception of a call upon reception of a radio signal including the identification number assigned to the receiver itself includes the intermediate-frequency section having the first filter used in a normal standby state and the second filter used in a display operation, the display detecting means for detecting the execution/non-execution of a display operation, and the filter switching means for switching from the first filter to the second filter when the display detecting means detects the execution of a display operation. The receiver also includes the display means for displaying information indicating the reception of a call upon reception of a radio signal including the identification number assigned to the receiver itself, and the display control means for inhibiting to display information including time information and a message on the display means in the normal standby state and allowing to display information including time information and a message on the display means when the user operates the switch. In addition, the first and second filters of the intermediate-frequency section have different characteristics. The first filter is a filter in which the constant is set to remove baud rate frequency noise including intermediate-frequency noise. The second filter is a filter in which the constant is set to remove, in addition to baud rate frequency noise, noise caused when the liquid crystal display of the display means is driven. The display means includes at least a light-emitting diode, a vibrator, or a speaker in addition to the liquid crystal display. With this arrangement, LCD driving noise caused in a display operation can be prevented from being radiated onto the radio section. Therefore, a deterioration in the sensitivity of the radio section can be suppressed, and the conductive LCD support frame used to reduce LCD driving noise in the conventional radio selective calling receiver need not be used, allowing the use of a resin material for an LCD support frame. For this reason, the adverse effects of electric contact with other parts can be prevented, and a reduction in cost can be attained.

What is claimed is:

1. A radio selective calling receiver for displaying information indicating the reception of a call upon reception of a radio signal including an identification number assigned to said receiver, comprising an intermediate-frequency section having a first filter used in a normal standby state and a second filter used in a display operation, display detecting means for detecting the execution/non-execution of the display operation, and filter switching means for switching from said first filter to said second filter when said display detecting means detects the execution of the display operation.

2. A receiver according to claim 1, further comprising display means for displaying information indicating the reception of a call upon reception of a radio signal including the identification number assigned to said receiver, and display control means for inhibiting display of information including time information and a message on said display means in the normal standby state and allowing to display the information including the time information and the message on said display means when a user operates a switch.

3. A receiver according to claim 1, wherein said first and second filters of said intermediate-frequency section have different characteristics, said first filter being a filter in which a constant is set to remove baud rate frequency noise including intermediate-frequency noise, and said second filter being a filter in which a constant is set to remove, in addition to the baud rate frequency noise, noise caused when a liquid crystal display of said display means is driven.

4. A receiver according to claim 2, wherein said display means comprises at least one of a light-emitting diode, a vibrator, and a speaker in addition to the liquid crystal display.

* * * * *